United States Patent [19]
Suetomi et al.

[11] Patent Number: 5,273,612
[45] Date of Patent: Dec. 28, 1993

[54] TIRE BUILDING DRUM

[75] Inventors: Satoru Suetomi; Yukitaka Okafuji, both of Kodaira, Japan

[73] Assignee: Bridgestone Corporation, Tokyo, Japan

[21] Appl. No.: 959,412

[22] Filed: Oct. 13, 1992

[30] Foreign Application Priority Data

Nov. 14, 1991 [JP] Japan .................. 3-325040

[51] Int. Cl.⁵ .................................. B29D 30/24
[52] U.S. Cl. ........................ 156/398; 156/414
[58] Field of Search .......... 156/131, 398, 414, 415, 156/416

[56] References Cited

U.S. PATENT DOCUMENTS 4,325,764  4/1982  Appleby et al. .......... 156/398
4,486,259 12/1984  Irie ........................... 156/416

FOREIGN PATENT DOCUMENTS 498180  1/1976  U.S.S.R.

Primary Examiner—Michael W. Ball
Assistant Examiner—Richard Crispino
Attorney, Agent, or Firm—Sughrue, Mion, Zinn Macpeak & Seas

[57] ABSTRACT

A large number of bead holding segments (30) are disposed along outer circumferences of a pair of drums (2, 2a). The bead holding segments can approach to and separate from each other in such manner that they can be expanded and contracted in the radial directions by means of an expanding/contracting mechanism (13, 17). A green tire is built and shaped while bead portions (3a) at the opposite ends of a green case (3) are being held by the segments (30). A bead holding unit (20) provided with the bead holding segments (30) and a drum main body section (10) provided with the expanding/contracting mechanism (13, 17) are formed separately from each other so that they can be freely mounted and dismounted, and the unit (20) is fixed to and released from the main body section (10) by means of a releasing mechanism (25, 6) provided on the side of the drum main body. Upon switching of a tire diameter size, only the unit (20) is replaced.

10 Claims, 6 Drawing Sheets

TIRE BUILDING DRUM

BACKGROUND OF THE INVENTION

1. Field of the Invention

The present invention relates to a tire building drum which is employed in a tire building and shaping process, and more particularly to such drum used for carrying out building and shaping of a green tire while gripping its bead portions. This drum is also utilized at the time of carrying out an appearance inspection while supporting beads of a tire in a tire inspection process.

2. Description of the Prior Art

Normally, upon fabrication of a radial tire, a green tire is built through two separate processes, and in the first process, a cylindrical green case is made. In the second process, a pair of drums disposed on a same axis in such manner that they can approach to and separate from each other, are employed, the bead portions at the opposite ends of the above-mentioned green case are made to be held by bead holding sections provided on the outer circumferential portions of the respective drums, and the above-mentioned green case is inflated and deformed into a toroidal shape by feeding high-pressure fluid into the green case and also making the respective drums approach to each other, under the above-mentioned condition. Then, by sticking a tread rubber onto the outer circumferential surface of the green case deformed into a toroidal shape through the above-mentioned process, a green tire is built and shaped.

A forming drum used in the above-described second process in the aforementioned radial tire building method, is disclosed in U.S. Pat. No. 4,472,233.

This forming drum includes an outer ring member fitted around a rotary shaft via an inner ring member or via an inner ring member and an intermediate ring member. On the above-mentioned outer ring member are provided a large number of drum segments severed along the circumferential direction and capable of protruding and entering in the radial directions. The radially outer end portions of the drum segments form a bead holding section for gripping the bead portions of the green case, and at the inner end portions thereof are rotatably supported rollers serving as cam followers.

On the other hand, a ring-shaped cylinder chamber is formed to surround the outer circumferential surface of the above-mentioned outer ring member, and a ring-shaped piston is fitted in the above-mentioned cylinder so as to be freely slidable in the axial direction. At one end of the piston is formed a conical inclined surface serving as a cam surface. The above-mentioned inclined surface and the aforementioned roller are engaged with each other. Accordingly, when the piston slides in the axial direction, the above-described drum segments (the bead holding section) would protrude or enter in the radial directions (expand or contract). And, the drum segments forming the bead holding section and the piston, the cylinder chamber and the like forming the bead holding section expanding and contracting mechanism, are assembled integrally with the above-described outer ring member.

Although the amount of expansion and contraction of the drum segments can be adapted to a certain degree of variation of a bead inner diameter with respect to tires having a same rim diameter, in the case where a tire rim diameter is different, the amount of expansion and contraction cannot be adapted to the difference of the bead inner diameter. Accordingly, in the case where, an attempt is made to form a tire having a different rim diameter, that is, upon switching of a tire size, the entirety of the integrally assembled bead holding section, expanding/contracting mechanism and outer ring member must be replaced as one unit.

In such a heretofore known forming drum, since the weight of the unit to be replaced upon switching of a tire size is heavy, the replacing work would become very laborious work. Also, significant time is necessitated for the switching.

In addition, since the unit to be replaced becomes large-sized, the place for keeping the units necessitates a sufficient amount of mechanical strength.

Furthermore, because of the fact that for each rim diameter of a tire, the entire unit including not only the bead holding section but also the expanding/contracting mechanism and the ring members must be fabricated and prepared, production costs rise.

Moreover, it is difficult to automate dismounting and mounting of the unit to be replaced.

SUMMARY OF THE INVENTION

It is therefore one object of the present invention to provide an improved tire building drum provided with a bead holding section on its outer circumference, which is free from all the above-described shortcomings of the tire building drum in the prior art.

A more specific object of the present invention is to provide a tire building drum which can reduce the labor necessitated for replacement of a drum and also can shorten a replacement time in the case of changing a kind of tires to be built.

Another object of the present invention is to provide a tire building drum which can greatly reduce an installation cost, and which facilitates automation of the drum replacement work.

According to one feature of the present invention, there is provided a tire building drum having a bead holding section on its outer circumference, comprising a drum main body section, a bead holding unit formed separately from the drum main body section and capable of being mounted to and dismounted from the drum main body section for replacement, and a bead holding section provided on the bead holding unit.

According to the present invention, at the time of switching to tires having a different rim diameter, that is, at the time of switching of a tire size, since it is only necessary to replace only a bead holding unit having a relatively light weight and a small size which merely constitutes a bead holding section with the drum main body section provided with the expanding/contracting mechanism and the like kept intact, the labor necessitated for the switching is reduced, and the switching time is also shortened.

In addition, since it is only necessary to prepare and stock various kinds of bead holding units adapted to rim diameters of tires and each having a simple structure as described above, the manufacturing cost of the entire drum including these replacement units is lowered, and the mechanical strength of the place for keeping the replacement units could be relatively small. Accordingly, an installation cost is greatly reduced.

Furthermore, by providing the mechanism for fixing and releasing the bead holding unit to and from the drum main body section, on the side of the drum main body section which is not necessitated to be replaced, it becomes easy to automate dismounting and mounting of the replacement unit.

The above-mentioned and other objects, features and advantages of the present invention will become more apparent by reference to the following description of preferred embodiments of the present invention taken in conjunction with the accompanying drawings.

DESCRIPTION OF THE PREFERRED EMBODIMENTS

Figure 1:
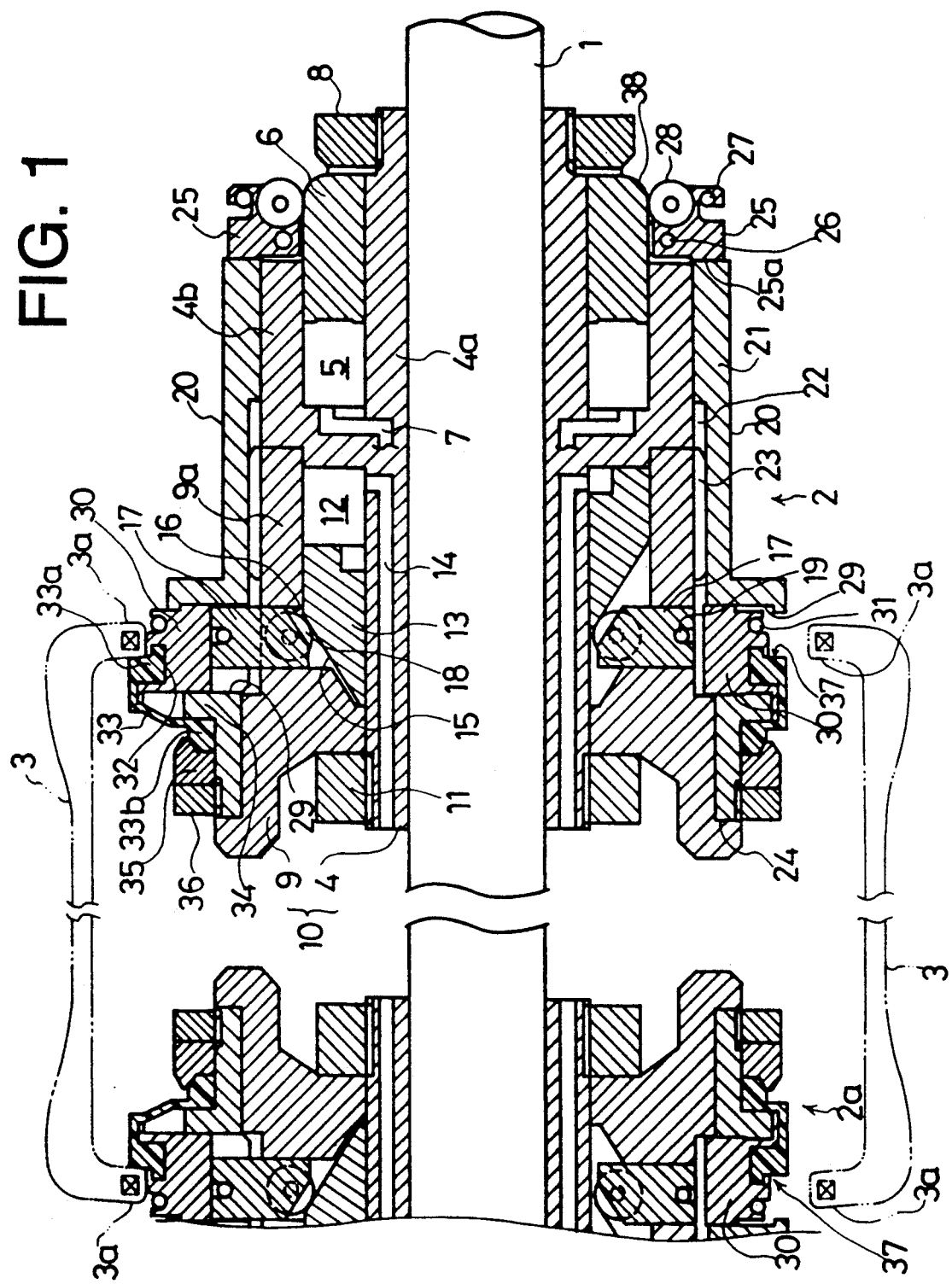
FIG. 1 is a longitudinal cross-section view of an essential part of a tire building drum assembly according to one preferred embodiment of the present invention.

Referring now to FIG. 1, an essential part of tire building drum assembly according to a first preferred embodiment of the present invention is illustrated in longitudinal cross-section. This drum assembly is used in the second process when a green tire of a radial tire is fabricated in two steps as described above. In this tire building drum assembly, a pair of drums 2 and 2a are mounted on a main shaft 1 as opposed to each other in the axial direction. The respective drums 2 and 2a are mounted in such manner that they can rotate integrally with the main shaft 1 and also can be moved in the axial direction so as to approach to or separate from each other. However, a moving mechanism in the axial direction is omitted from illustration.

A green case 3 is mounted to bridge these drums 2 and 2a with its bead portions 3a, 3a at the opposite ends engaged with the respective drums. While high-pressure fluid (air or the like) is fed to the inside of this green case 3, the drums 2 and 2a are moved in the directions approaching to each other to make the green case 3 inflate and deform into a toroidal shape, then while the drums 2 and 2a are being rotated by the main shaft 1, a tread rubber and the like are stuck onto the outer circumferential surface of the green case 3, and thereby a green tire is built and shaped.

Since the drum 2 and the drum 2a have substantially the same structure, in the following, description will be made in detail only on the drum 2.

Reference numeral 4 designates a cylindrical drum main body section member, which is fitted around the main shaft 1 in such manner that though it rotates integrally with the latter, it is slidable in the axial direction. An axially outward portion (the right side portion as viewed in FIG. 1) of the drum main body section member 4 has a dual tubular structure consisting of an inner tubular portion 4a and an outer tubular portion 4b, an annular cylinder chamber 5 is formed between the respective portions 4a and 4b, and an annular piston 6 is fitted in cylinder chamber 5. The cylinder chamber 5 is connected via a passageway 7 to an appropriate pressurized fluid source, and the piston 6 is reciprocated in the axial direction by feeding or exhausting pressurized fluid to or from the cylinder chamber 5. The maximum stroke of the piston 6 is restricted by a stopper 8 threadedly fastened to the tubular portion 4a.

On the axially inward portion of the drum main body section member 4 is further fitted another drum main body section member 9, and a drum main body section 10 is composed of the drum main body section members 4 and 9. The drum main body section member 9 is provided with a tubular portion 9a extending towards the above-mentioned outer tubular portion 4b of the drum main body section member 4. By making this tubular portion 9a butt against the outer tubular portion 4b and pressing the former against the latter by means of an annular nut 11 threadedly engaged with the inner end portion of the drum main body section member 4, the drum main body section member 9 is fixed to the drum main body section member 4.

Between the tubular portion 9a of the drum main body section member 9 and the drum main body section member 4 is formed an annular cylinder chamber 12, and an annular piston 13 is fitted in this cylinder chamber 12 so as to be slidable in the axial direction. The right end portion as viewed in FIG. 1 of the cylinder chamber 12 communicates with a pressurized fluid source via a passageway 14, and the end surface of the piston 13 on the opposite side forms a conical inclined surface 15 having a gradually decreasing diameter towards its tip end.

At the base portion of the tubular portion 9a of the drum main body section member 9, that is, at the position corresponding to the inclined surface 15 of the piston 13, are provided a large number of holes 16 penetrating through the tubular portion 9a in the radial directions as arrayed along the circumferential direction, and expanding/contracting segments 17 are fitted in these holes 16 so as to be freely projected and retracted in the radial directions. Rollers 18 serving as cam followers are rotatably supported at the inner ends of the respective expanding/contracting segments 17, and a spring 19 consisting of, for instance, a rubber ring is mounted by fitting so as to connect the outer ends of the respective expanding/contracting segments 17 arrayed along the circumferential direction. Accordingly, the respective expanding/contracting segments 17 are biased radially inwards, hence always butt against the inclined surface 15 of the piston 13 via the rollers 18, when the piston 13 moves in the axial direction the segments 17 are moved in the radial direction within the holes 16 as guided by the inclined surface 15, and in response to this movement a cylindrical surface connecting the outer ends of the respective expanding/contracting segments 17 would expand or contract. It is to be noted that in FIG. 1, the upper half portion shows the state where the expanding and contracting segments 17 have expanded, while the lower half portion shows the state where they have contracted.

Figure 2:
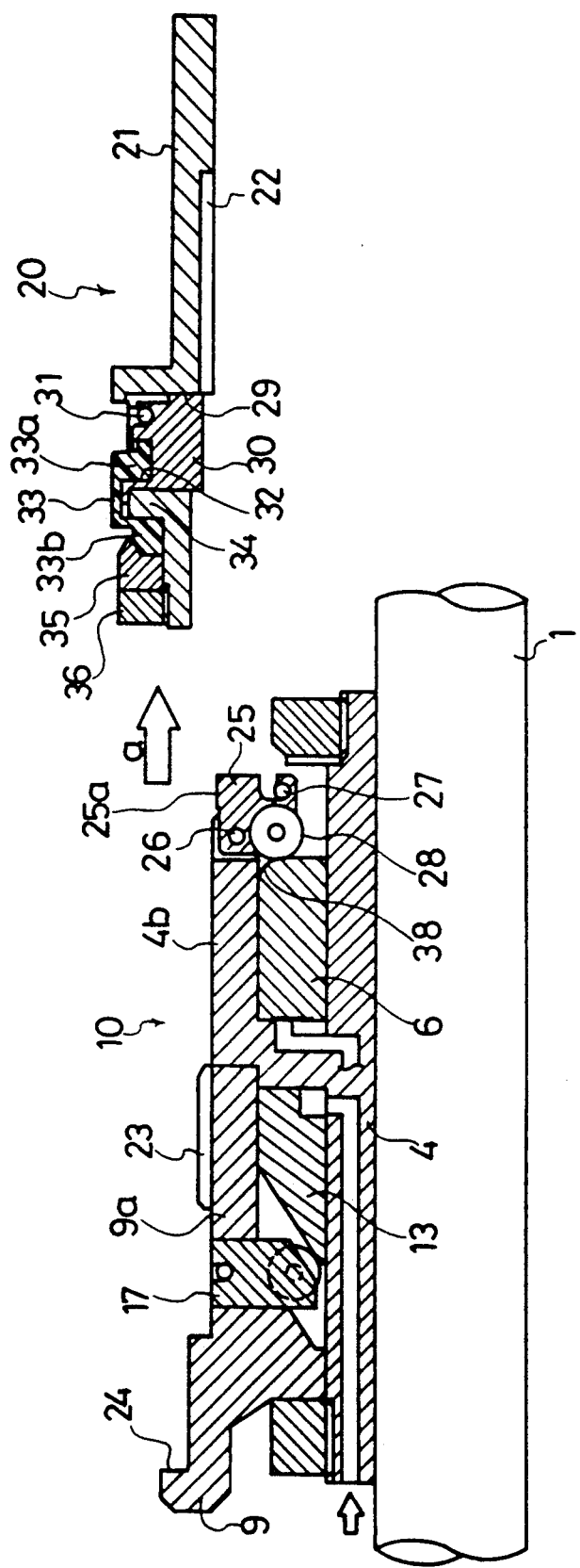
FIG. 2 is a longitudinal cross-section view of a drum half portion showing the state where a bead holding unit has been dismounted from a drum main body section.

A bead holding unit 20 is detachably fitted around the outer circumferential surface of the drum main body section 10 constructed in the above-described manner (See FIG. 2). The bead holding unit 20 is provided with a tubular unit main body 21, and it is fitted around the drum main body section 10 by inserting from the right to the left as viewed in FIGS. 1 and 2 with a key slot 22 in the axial direction formed on the inner surface of the unit main body 21 engaged with a key 23 projected on the outer circumferential surface of the tubular portion 9a of the above-described drum main body section member 9. A step 24 is formed along the circumferential edge at the left end of the drum main body section member 9, the unit main body 21 is inserted until its tip end butts against the step 24. At this time the other end surface of the unit main body 21 becomes nearly flush with the outer tubular portion 4b of the drum main body section member 4.

On the outer tubular portion 4b are disposed a plurality of lock segments 25 along the circumferential direction contiguously with the above-mentioned end surface. The respective lock segments 25 are swingably hinged to the outer tubular portion 4b via pins 26, and by means of a ring-shaped spring 27 fitted in these segments so as to connect them, all the lock segments 25 are biased so as to swing radially inwards. Also, rollers 28 serving as cam followers are pivotably supported from the lock segments 25, and so, the lock segments 25 are held in contact with the circumferential surface of the piston 6 via these rollers 28. Accordingly, when pressurized fluid is introduced into the cylinder chamber 5 and the piston 6 is present at its outer position shown in FIG. 1, since the rollers 28 are held in contact with the cylindrical outer circumferential surface portion of the piston 6, the respective lock segments 25 are pushed and expanded radially outwards against the biasing forces of the spring 27. Hence the unit main body 21 is urged against the step 24 by the urging surfaces 25a of the lock segments 25, and thereby the unit main body 21 is fixed at a predetermined position on the drum main body section 10.

In the unit main body 21 are formed guide holes 29 directed in the radial directions respectively at the positions corresponding to the respective expanding/contracting segments 17 on the side of the above-described drum main body section 10. In the respective guide holes 29 are respectively fitted bead holding segments 30 in a radially expansible and contractible manner. The respective bead holding segments 30 are biased radially inwards by means of a spring 31 similar to the above-described spring 19. As shown in the upper half portion of FIG. 1, if the expanding/contracting segments 17 are pushed out by the inclined surface 15 of the piston 13, the bead holding segments 30 are pushed out by these expanding/contracting segments 17 and would occupy their expanded positions, while as shown in the lower half portion of FIG. 1, if the respective expanding/contracting segments 17 are contracted to their inward positions, the segments 30 would occupy their contracted positions.

The outer circumferential portions of the respective bead holding segments 30 each project in an arcuate shape along the circumferential direction. In the outer circumferential portions are similarly formed grooves 32 extending in an arcuate shape along the circumferential direction, and a thick-walled fixing portion 33a formed along one edge portion of an annular seal member 33 made of elastic material such as rubber or the like is air-tightly fitted in the grooves 32 of the respective bead holding segments 30 and extends in a ring-shape. A thick-walled fixing portion 33b formed along the other edge portion of the seal member 33 is fitted on the outer circumferential surface of the unit main body 21, and is pinched between an annular protrusion 34 provided on the unit main body 21 and a fixing ring 35 fitted around the unit main body 21, and it is air-tightly fixed by a fastening force of an annular nut 36. The seal member 33 is provided for the purpose of preventing inner pressurized fluid from leaking out when the green case 3 is inflated and deformed into a toroidal shape.

In order to mount the green case 3 onto this drum assembly consisting of a pair of drums 2 and 2a, under the condition where the bead holding segments 30 of the both drums 2 and 2a have been retreated to the contracted positions as shown in the lower half portion of FIG. 1, the bead portions 3a on the opposite sides of the green case 3 are brought into contact with bead holding sections 37 formed of the outer circumferential surfaces of the bead holding segments 30 and the fixing portions 33a of the seal members 33. Subsequently the pistons 13 are advanced as shown in the upper half portion of FIG. 1 by feeding pressurized fluid through the passageways 14 into the cylinder chambers 12, and thereby the bead holding segments 30 are expanded by the inclined surfaces 15 via the expanding/contracting segments 17. Then the bead portions 3a are held by the above-mentioned bead holding sections 37.

In the case where building and shaping of a different kind of tire having a different tire rim diameter are carried out, only the bead holding units 20 are replaced with the drum main body section 10 is kept intact. Upon replacement of the bead holding unit 20, in the case where the expanding/contracting segments 17 are projecting into the guide holes 29 in the bead holding unit 20 as shown in the upper half portion of FIG. 1, the expanding/contracting segments 17 are made to escape from the guide holes 29 by exhausting pressurized fluid from the cylinder chamber 12 to retreat the piston 13, and at the same time pressurized fluid is exhausted from the cylinder chamber 5. Then, as the piston 6 retreats inwards of the cylinder chamber 5, the rollers 28 biased radially inwards by the spring 27 would move radially inwards along the cam surface 38 formed at the end portion of the piston 6. As a result, the lock segments 25 would rotate inwards about the pins 26 and would be positioned inside of the outer circumferential surface of the drum main body section 10, accordingly inside of the inner circumferential surface of the bead holding unit 20 (FIG. 2). In this way, fixing of the bead holding unit 20 to the drum main body section 10 is released, and the bead holding unit 20 can be extracted axially outwards as shown by arrow a in FIG. 2.

To the drum main body section 10 after the bead holding unit 20 was extracted therefrom, is fitted a different bead holding unit adapted to a tire intended to be worked on next. Fixing of this new bead holding unit is effected through the steps of making the piston 6 take a stroke axially outwards by feeding pressurized fluid into the cylinder chamber 5, and causing the lock segments 25 to swing radially outwards via rollers 28 by means of the outer circumferential surface of the piston 6 as described above.

In this way, fixing and releasing of the bead holding unit 20 with respect to the drum main body 10 are carried out automatically by feeding and exhausting pressurized fluid through the passageway 7 into and from the cylinder chamber 5.

Figure 3:
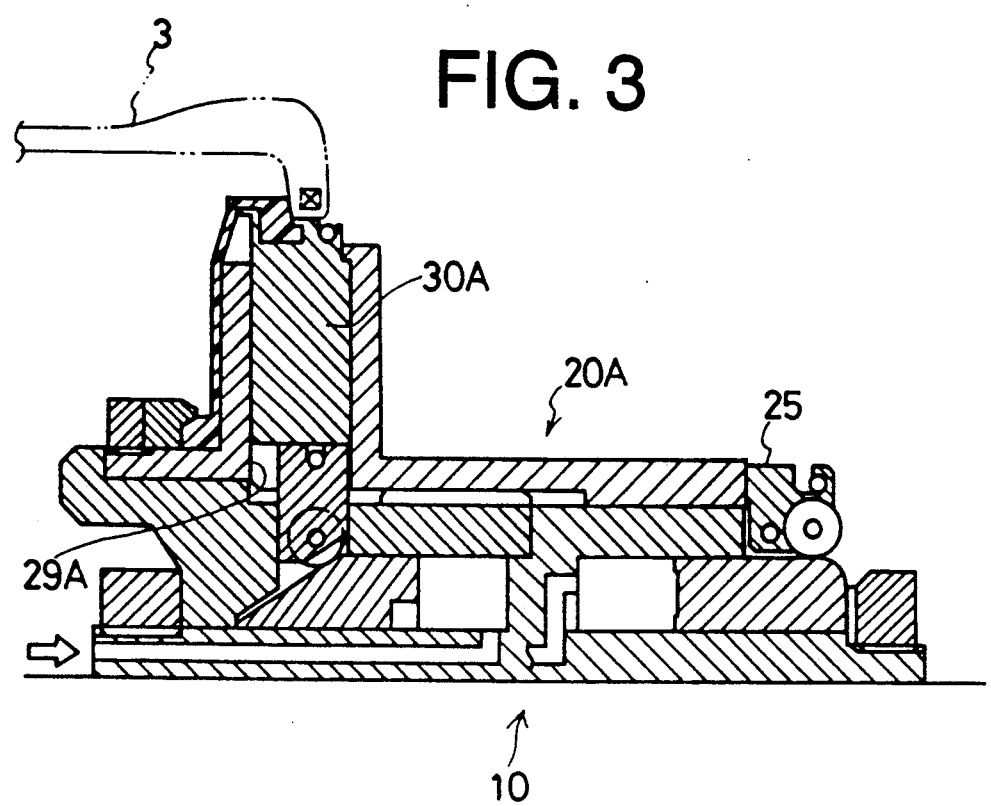
FIG. 3 is a longitudinal cross-section view showing a drum half portion at the time when another bead holding unit has been mounted to the drum main body section.

FIG. 3 shows the state where a different bead holding unit 20A has been fitted and fixed to the same drum main body section 10. This bead holding unit 20A is to be used for tires having a larger rim diameter than the above-described tire. It is provided with guide holes 29A and bead holding segments 30A having larger heights than the guide holes 29 and bead holding segments 30 of the above-described bead holding unit 20.

According to this first preferred embodiment, the expanding/contracting mechanism consisting of the piston 13, the expanding/contracting segments 17 and the like and the fixing/releasing mechanism consisting of the piston 6, the lock segments 25 and the like are provided on the drum main body section 10. Moreover this drum main body section 10 is available in common for various kinds of tires having different rim diameters, and so, upon change of a tire size it is only necessary to replace only the bead holding unit 20 consisting of the unit main body 21, the bead holding segments 30 and the like and having a relatively light weight, small sizes and a simple structure, labor necessitated upon switching of tires is reduced, and a switching time is also shortened.

In addition, a manufacturing cost of a drum assembly including replacement units is lowered, a mechanical strength of the place for keeping replacement units could be relatively small, and accordingly, an installation cost is greatly reduced.

Figure 4:
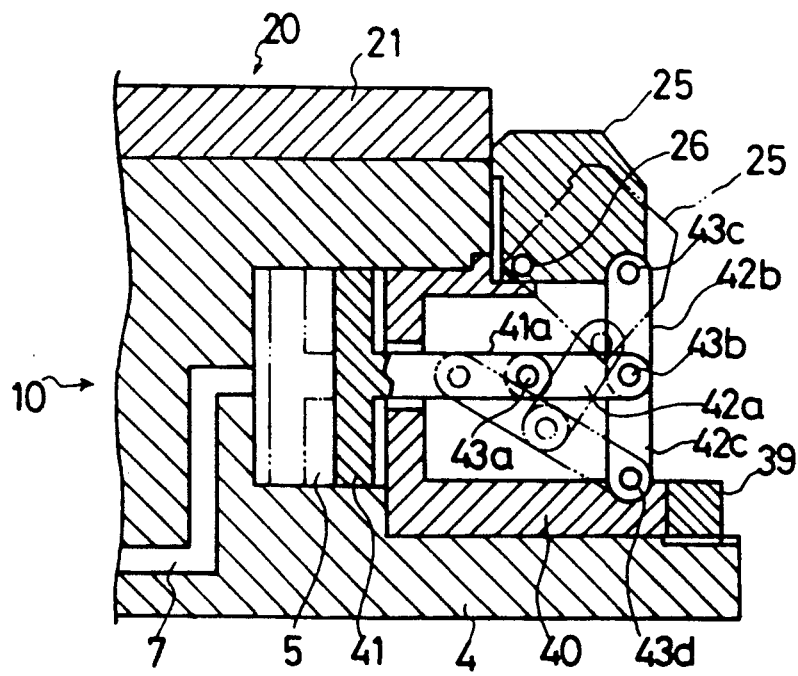
FIG. 4 is a partial longitudinal cross-section view of a drum showing a first modified embodiment of a bead holding unit fixing/releasing mechanism.

FIG. 4 shows a modified embodiment of the mechanism for fixing and releasing a bead holding unit 20 to and from the drum main body section. In this modified embodiment, while a cylinder chamber 5 connecting with a pressurized fluid source via a passageway 7 is provided in a drum main body section member 4 of a drum main body section 10 similarly to the above-described first preferred embodiment, an opening portion of this cylinder chamber 5 is covered by a lid member 40 which is fixed to the drum main body section member 4 as fastened by means of an annular nut 39, and lock segments 25 are pivotably supported from this lid member 40 via pins 26. And a piston rod 41a of a piston 41 fitted in the cylinder chamber 5 projects outwards penetrating through the lid member 40, and to the tip end of the same piston rod 41a is pivotably secured one end of a link member 42a via a pin 43a. To the other end of the link member 42a are respectively pivotably secured two link members 42b and 42c via a pin 43b, the other end of the link member 42b is pivotably secured to a lock segment 25 via a pin 43c, and the other end of the link member 42c is pivotably secured to the lid member 40 via a pin 43d. When the piston 41 is present at its advanced position as pushed by pressurized fluid within the cylinder chamber 5, the respective link members 42a, 42b and 42c take the states shown by solid lines in FIG. 4, and the lock segment 25 urges an end surface of the unit main body 21 and fixes the unit main body 21. When pressurized fluid is exhausted from the cylinder chamber 5 and the piston 41 retreats, the respective link members 42a, 42b and 42c would be folded as shown by double-dot chain lines in FIG. 4, thereby the lock segment 25 rotates to the position shown by double-dot chain lines, and fixing of the unit main body 21 is released. The lock segments 25 shown in FIG. 4 are also provided with a spring (not shown) similar to the spring 27 in the above-described first preferred embodiment.

Figure 5:
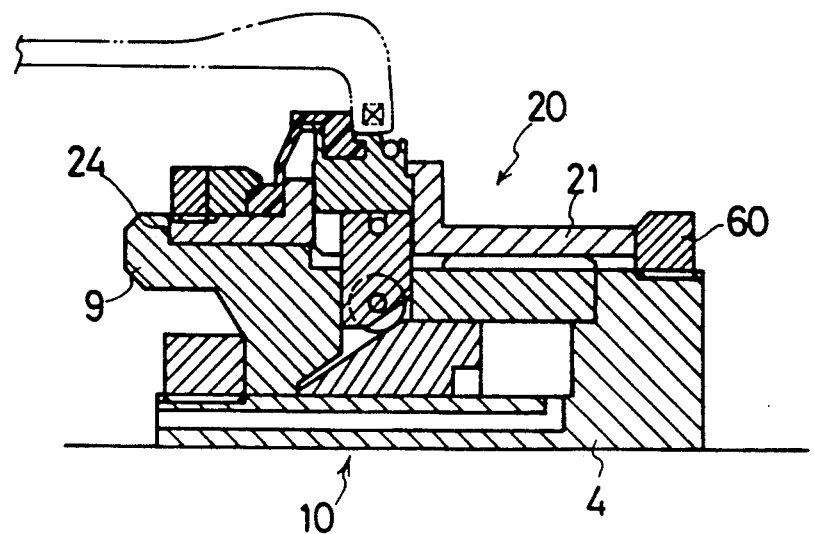
FIG. 5 is a longitudinal cross-section view of a drum half portion showing a second modified embodiment of a bead holding unit fixing/releasing mechanism.

FIG. 5 shows a second modified embodiment of a bead holding unit fixing/releasing mechanism. In this modified embodiment, a bead holding unit 20 is fixed to a drum main body section 10 by urging a unit main body 21 of the bead holding unit 20 against a step 24 of a drum main body section member 9 by means of an annular nut 60 threadedly mated with an outer circumferential surface of an end portion of a drum main body section member 4.

Figure 6:
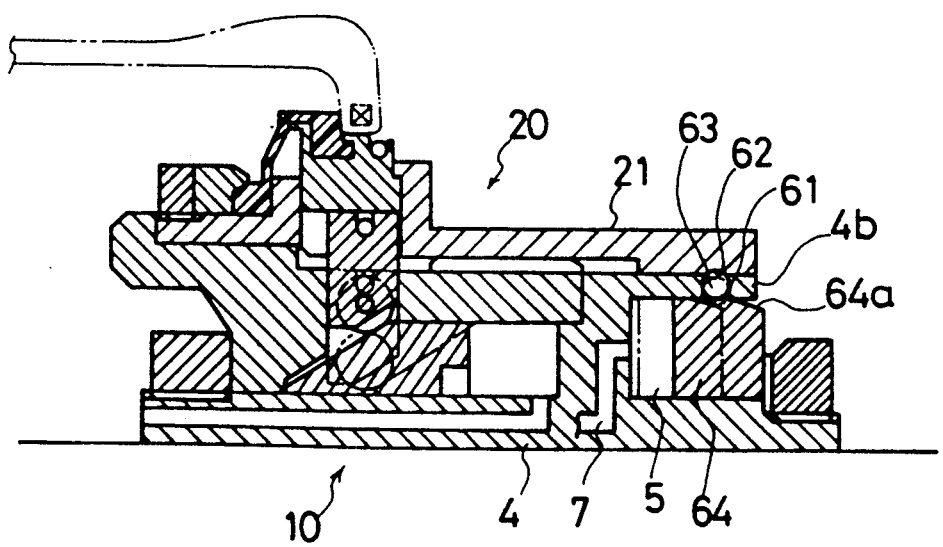
FIG. 6 is a longitudinal cross-section view of a drum half portion showing a third modified embodiment of a bead holding unit fixing/releasing mechanism.

FIG. 6 shows a third modified embodiment of a bead holding unit fixing/releasing mechanism. In this modified embodiment, holes 61 directed in the radial directions are formed in an outer tubular portion 4b of a drum main body section member 4, also hemi-spherical recesses 62 are formed on an inner circumferential surface of a unit main body 21 at the positions corresponding to the above-mentioned holes 61, and balls 63 are fitted in the holes 61. The balls 63 are held in contact with a cam surface 64a formed on an outer circumference of a piston 64 which can reciprocate within a cylinder chamber 5. When the piston 64 is present at a position depicted by solid lines in FIG. 6, the balls 63 project radially outwards from the holes 61, engage with the recesses 62, and thereby fix the bead holding unit 20 to the drum main body section 10, while when the piston 64 is present at a position depicted by chain lines in FIG. 6, they are disengaged from the recesses 62 to release the bead holding unit 20.

Figure 7:
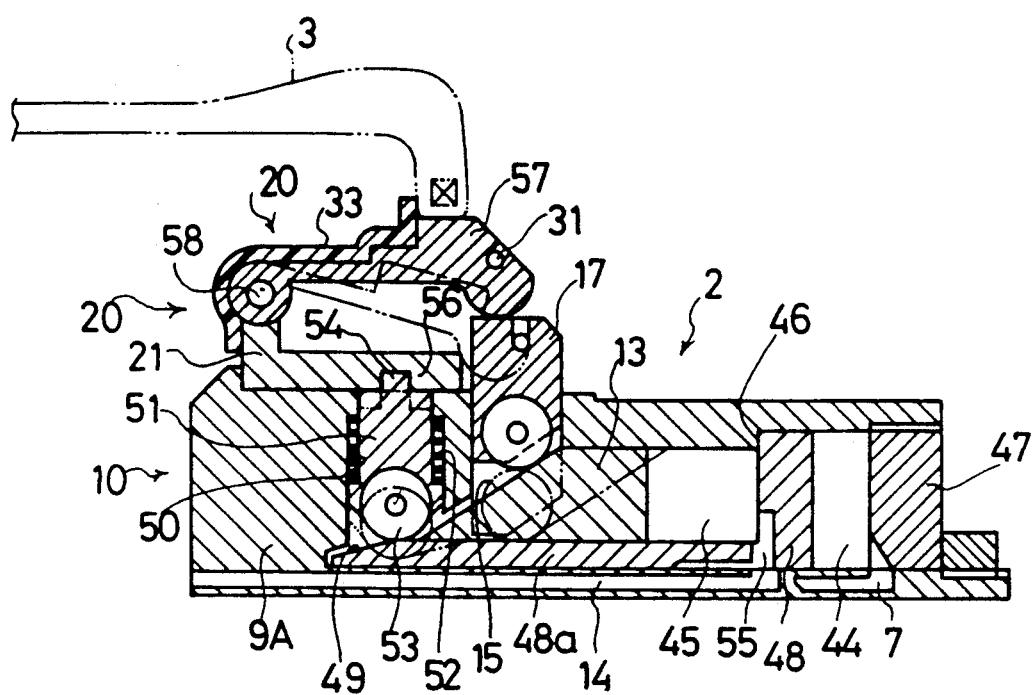
FIG. 7 is a longitudinal cross-section view showing a drum half portion according to a second preferred embodiment of the present invention.

FIG. 7 is a longitudinal cross-section view showing a half portion of a drum 2 according to another preferred embodiment of the present invention, in which component parts equivalent to those included in the above-described preferred embodiments are given like reference numerals.

A drum main body section 10 of this drum 2 consists of a single drum main body section member 9A, and in this drum main body section member 9A are formed an annular cylinder chamber 44 and opening at its right end surface and an annular cylinder chamber 45 extending further inwards (leftwards) from this cylinder chamber 44. The outer diameter of the cylinder chamber 45 is somewhat smaller than the outer diameter of the cylinder chamber 44, at the joint portion between the respective cylinder chambers is formed a step 46. An opening portion at the right end of the cylinder chamber 44 is closed by a lid member 47.

A lock piston 48 is fitted in the cylinder chamber 44 connected to a pressurized fluid source via a passageway 7 so as to be reciprocatable between the above-mentioned lid member 47 and the step 46. The lock piston 48 is integrally provided with a tubular projecting portion 48a extending in the axial direction along a circumferential surface on the inside of the annular cylinder chamber 45. The tip end portion of the projecting portion 48a forms a conical inclined surface 49.

A plurality of radial holes 50 opening at the circumferential surface are formed in the drum main body section member 9A at the positions corresponding to the tip end portion of the above-described projecting portion 48a at predetermined intervals along the circumferential direction, and lock segments 51 are slidably provided respectively in the respective holes 50. The lock segments 51 are biased radially inwards by means of a coil spring 52 and are held in contact with the above-mentioned inclined surface 49 via freely rotatable rollers 53 pivotably supported at their inner end portions. Accordingly, when the lock piston 48 reciprocates, the lock segments 51 would slide in the radial directions within the holes 50 as guided by the inclined surface 49. When they have been pushed up to the outermost positions by the inclined surface 49 as shown by solid lines in FIG. 7, plug-shaped protrusions 54 formed at their outer ends would project from the outer circumferential surface of the drum main body section member 9A.

The cylinder chamber 45 communicates with a pressurized fluid source through a passageway 55 formed in the lock piston 48 and a passageway 14. In the cylinder chamber 45 is fitted a piston 13 similar to that in the above-described preferred embodiment, and expanding-/contracting segments 17 are engaged with this piston 13. However, since this expanding/contracting mechanism is quite identical to that provided in the above-described preferred embodiments, a detailed description thereof will be omitted.

A bead holding unit 20 comprises a unit main body 21 which is shorter than that provided in the above-described preferred embodiment, and this unit main body 21 is detachably fitted around the outer circumferential surface of the inner (lefthand) portion of the drum main body section member 9A. On the inner circumferential surface of the unit main body 21, at the positions corresponding to the protrusions 54 of the lock segments 51 are formed engagement holes 56 to be engaged with the protrusions 54. When the lock segments 51 have been retracted into the drum main body section member 9A by retracting the lock piston 48 and also the expanding/contracting segments 17 have been likewise retracted into the drum main body section member 9A by retracting also the piston 13, the unit main body 21 is inserted from the right around the drum main body section member 9A. Subsequently if the lock piston 48 is advanced, the lock segments 51 are pushed out by the inclined surface 49, hence their protrusions 54 are engaged with the engagement holes 56 in the unit main body 21, and thereby the unit main body 21, that is, the bead holding unit 20 can be fixed to the drum main body section 10.

Bead holding segments 57 in this preferred embodiment have a remarkably different structure from the bead holding segments 30 in the above-described preferred embodiments. More particularly, the respective bead holding segments 57 extend in the axial direction externally of the cylindrical portion of the unit main body 21 with their one ends swingably supported at the end portion of the unit main body 21 via pins 58. At the other end they are held in contact with head portions of the expanding/contracting segments 17. The respective bead holding segments 57 are urged against the outer end surfaces of the corresponding expanding/contracting segments 17 by means of a spring 31. Similar to the above-described preferred embodiments, and they are made to swing about the pins 58 as a result of movements in the radial directions of the expanding/contracting segments 17 caused by the piston 13, and thus expand and contract. A seal member 33 has its opposite edge portions fixed to the bead holding segments 57 and the unit main body, respectively, and it is disposed so as to extend along the back surfaces of the bead holding segments 57.

Upon change of a tire size, by retracting the lock segments 51 and the expanding/contracting segments 17 into the drum main body section member 9A by retracting the lock piston 48 and the piston 13, the bead holding unit 20 can be replaced very easily like the above-described preferred embodiments. Fixing and releasing of the bead holding unit 20 to and from the drum main body section 10 can be carried out automatically by controlling the feed and exhaust of pressurized fluid to and from the cylinder chamber 44.

Figure 8:
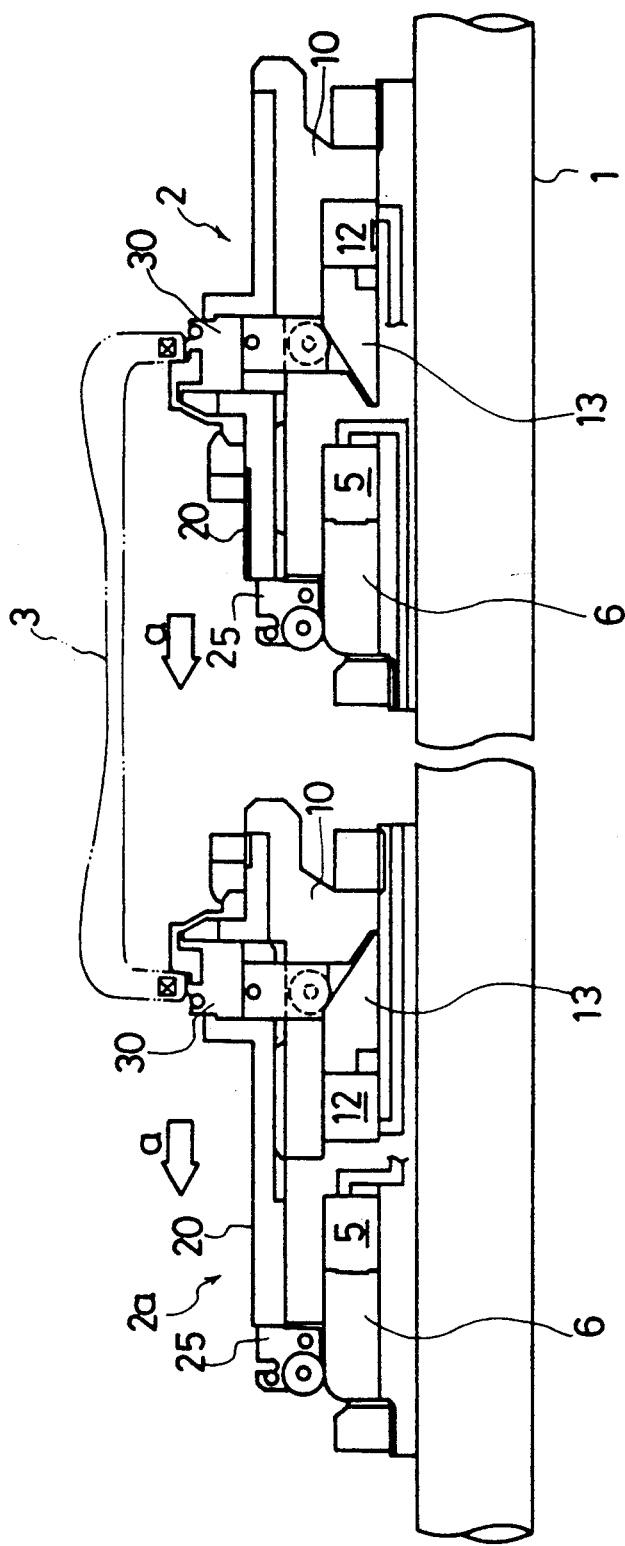
FIG. 8 is a longitudinal cross-section view showing a drum half portion according to a third preferred embodiment of the present invention.

While one preferred embodiment in which in the case of extracting bead holding units for the purpose of changing a tire size, for a drum 2a it is extracted towards the left side as viewed in FIG. 1, but for a drum 2 it is extracted towards the right side as viewed in FIG. 1, was illustrated in FIG. 1, in FIG. 8 is shown another preferred embodiment, in which the bead holding units are extracted both to the left side, for instance, to the side opposite to the side from which the drum is driven. In FIG. 8, component parts similar to those shown in FIG. 1 are given like reference numerals.

While a principle of the present invention has been described above in connection to a number of preferred embodiments of the invention, it is a matter of course that many changes and modifications can be made to the above-described construction without departing from the spirit of the present invention.

What is claimed is:

1. A tire building drum comprising; a drum main body section and a bead holding unit formed separately from said drum main body section and capable of being mounted to and dismounted from said drum main body section for replacement, said bead holding unit includes a bead holding section and a tubular unit body adapted to fit around an outer circumferential surface of said drum main body section; said drum main body section includes a fixing/releasing mechanism for fixing or releasing said bead holding unit to or from said drum main body section, said fixing/releasing mechanism having lock segments pivotably supported from said drum main body section so as to be swingable in the radial direction and engaging with an end surface of said bead holding unit at radially outward positions of said lock segments.

2. A tire building drum as claimed in claim 1, wherein said lock segments are supported by a circumferential surface having a cam surface of a piston provided within said drum main body section so as to be reciprocatable in the axial direction.

3. A tire building drum as claimed in claim 1, wherein said lock segments are connected via linkages to a piston provided within said drum main body so as to be reciprocatable in the axial direction.

4. A tire building drum as claimed in claim 1, wherein said bead holding section is composed of a plurality of bead holding segments severed along the circumferential direction and capable of being expanded and contracted in the radial directions, and an expanding/contracting mechanism for expanding and contracting said bead holding segments is provided in said drum main body section.

5. A tire building drum comprising: a drum main body section and a bead holding unit formed separately from said drum main body section and capable of being axially mounted to and dismounted from said drum main body section for replacement; said bead holding unit including a tubular unit body adapted to fit around an outer circumferential surface of said drum main body section and a bead holding section composed of a plurality of bead holding segments severed along the circumferential direction and mounted on said tubular unit body, said segments capable of being expanded and contracted in the radial direction; the drum main body section including a fixing/releasing mechanism for fixing or releasing the bead holding unit to the drum main body and an expanding/contracting mechanism to cooperate with said bead holding segments when the tubular body unit is mounted to said drum main body section to expand/contract said segments; said fixing/releasing means allowing ready removal of said bead lock holding unit from said drum main body section said fixing/releasing means remaining part of said drum main body section upon removal of said bead holding unit.

6. A tire building drum as claimed in claim 5, wherein said fixing/releasing mechanism includes lock members provided in said drum main body section so as to be movable in the radial directions and engaging with said bead holding unit when said lock members protrude from a circumferential surface of said drum main body section.

7. A tire building drum as claimed in claim 6, wherein said lock members are supported by a circumferential surface having a cam surface of a piston provided within said drum main body section so as to be reciprocatable in the axial direction.

8. A tire building drum as claimed in claim 5, wherein said bead holding segments are slidably fitted in radial guide holes provided in said tubular unit body.

9. A tire building drum as claimed in claim 5, wherein said bead holding segments are pivotably supported by said tubular unit body so as to be swingable in the radial directions.

10. A tire building drum as claimed in claim 5, wherein said expanding/contracting mechanism comprises a plurality of expanding/contracting segments severed in a circumferential direction and capable of being expanded and contracted in the radial directions, and an annular piston reciprocatable in the axial direction and having a part of its circumferential surface formed in a conical inclined surface, and the radially outer ends of said expanding/contracting segments are engaged with said bead holding segments, while the radially inner ends of said expanding/contracting segments are engaged with said conical inclined surface.

* * * * *